United States Patent [19]
Welton

[11] 3,746,405
[45] July 17, 1973

[54] WELL DRILLING BIT LUBRICATION AND SEAL

[75] Inventor: Russell L. Welton, Anaheim, Calif.

[73] Assignee: Globe Oil Tools Company, a division of the Rucker Company, Los Nietos, Calif.

[22] Filed: Nov. 18, 1971

[21] Appl. No.: 200,075

[52] U.S. Cl. ............................................. 308/8.2
[51] Int. Cl. ................................... F16c 33/66
[58] Field of Search .................. 308/8.2, .009, .011, 308/101, 102, 8

[56] References Cited
UNITED STATES PATENTS

| 316,612 | 4/1885 | Farr | 308/102 |
| 303,283 | 8/1884 | Howe | 308/101 |
| 2,192,697 | 3/1940 | Scott | 308/8.2 |
| 2,654,577 | 10/1953 | Green | 308/8.2 |
| 2,717,071 | 9/1955 | Cook | 308/.011 |
| 3,467,448 | 9/1969 | Galle | 308/8.2 |
| 3,361,494 | 1/1968 | Galle | 308/8.2 |
| 3,397,928 | 8/1968 | Galle | 308/8.2 |
| 3,620,580 | 11/1971 | Cunningham | 308/8.2 |

OTHER PUBLICATIONS

Molybdenum Disulfide Uses are Growing by Norman M. Lloyd, published in Automotive Industries, Apr. 1, 1962, pages 41 thru 45 relied upon.

Primary Examiner—Charles J. Myhre
Assistant Examiner—Frank Susko
Attorney—William H. Maxwell

[57] ABSTRACT

A journal bearing lubrication means and a seal cooperatively combined therewith to maintain lubrication throughout the useful life of the roller cutter of a well drilling bit, to the exclusion of foreign materials entering therein from the drilling fluids and surrounding earth formations. A journal bearing of right cylinder form is provided, characterized by the formation of a strategically placed recess, or recesses therein and all without subtracting from the load carrying capabilities of the bit; the assembly being retained in working condition by a single element combined with the lubrication means and assuring proper axial placement of the roller cutter.

26 Claims, 6 Drawing Figures

PATENTED JUL 17 1973 3,746,405

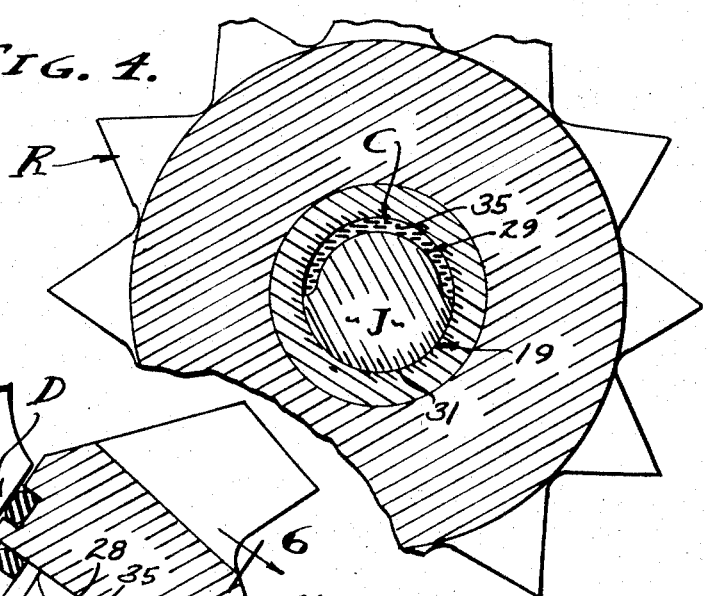
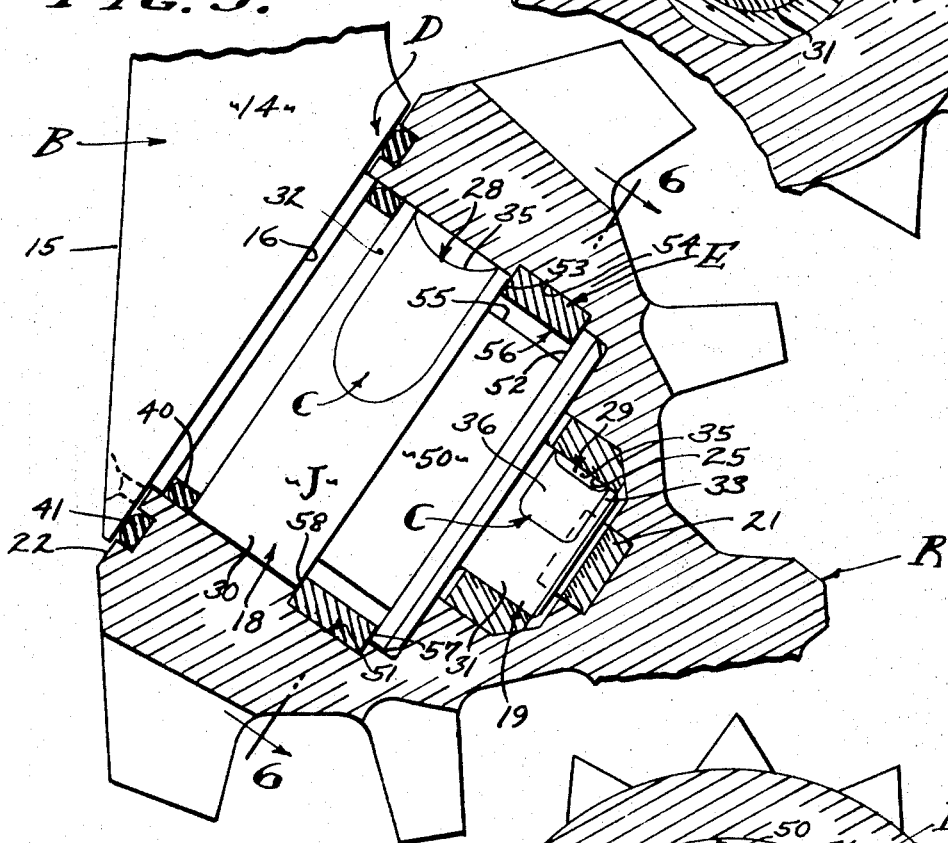
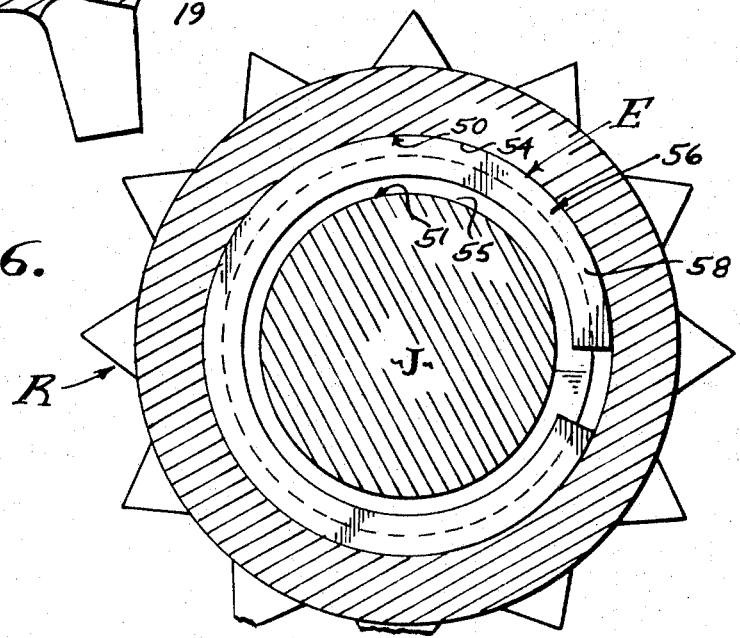

WELL DRILLING BIT LUBRICATION AND SEAL

BACKGROUND

Roller bits and the like of the prior art have been provided with various types of lubricating schemes involving grease resevoirs with elaborate barrier means and/or seals to keep the drilling mud out of the bearings; or conversly to prevent loss of lubricating grease. However, and despite the complications resorted to in order to obviate the usually short bearing life of such rollers, there has definitely been an expected loss of lubricating grease during normal operations and resulting in premature destruction of the bearings. That is, the bearing structure of the prior art roller bits can be expected to fail before the roller cutters have reached the end of their expected service. Therefore, I have concluded that the prior art roller bits, exemplified by those having grease resevoir diaphragms operated upon by the pressures of the fluid column in the annulus of the bore, subject the seals to a pumping action which removes lubricating grease from the bearings of the bit, due to slush-pump pulsations and the churning action of the rotating rollers. In any case, the prior art roller bits do run dry, and consequently are prematurely self-destructive insofar as the bearings are concerned.

In the exploration for and drilling of production wells, greater depths and its consequences are involved; and there has been the return to the use of journal bearing rollers in order to better withstand the increased loads and in order to extend the bearing life, assuming that lubrication is maintained. Consequently, journal bearing roller bits of the type under consideration are being employed, using the aformentioned grease resevoir but with adverse effects as is recognized by the loss of lubrication before the roller cutters are fully utilized.

Insofar as journal bearings are concerned, as distinguished from series of balls or rollers as bearings, separate and complex lubrication means have been provided since it has been thought that space for adequate lubrication is unavailable within the confines of the "leg and bearing" structure, and within which area I do now in fact provide adequate lubrication for life time operation of the bit.

Roller cutters of the type under consideration have been retained on the legs in various ways, for example by means of a series of balls inserted into complementary grooves during assembly, and it is this retainment of the roller on the leg which involves complexities in machining and assembly; wherein a large number of balls is involved and which requires a means to confine them to operating position.

FIELD OF INVENTION

This invention has to do with well drilling bits and the like used incidently to carry out the rotary method of drilling and to provide therein a simple practical and improved structure for extending the bearing life of the roller structure. Specifically, it is a combined lubrication means and sealing means therefor which I provide for rotary rock bits, reamer cutters, expanding underreamers, and the like. Therefore, it is a primary object of this invention to provide a life time supply of lubrication to the bearings of the rollers and to seal the same therein while preventing the entry therein of drilling mud, sand, water or other foreign materials which would reduce the bearing life.

It is an object of this invention to provide a combined journal bearing and lubricating means therefor simplified in the formation of the elements necessary in the basic conbination, and all without sacrificing the load carrying capabilities. With the present invention, the formation of the means providing lubrication is confined to portions of the bearing journals which are not subjected to high loads, while those portions which are so subjected remain in optimum form for that purpose.

It is another object to provide seals for a roller cutter journaled on a leg, whereby tendancy for pumping of lubricant out of the bearings is inhibited if not completely eliminated. With the present invention the chamber or chambers that contain lubrication comprises a single cavity, with no secondary means such as to cooperate with adverse pulsations having pumping action. In other words, the bearing and lubrication chamber within the roller cutter is established by a single cavity having but one opening to be sealed and within which the substantially incompressible lubricating fluid is contained.

It is also an object of this invention to eliminate costly fluid resevoirs and complications associated therewith, this being accomplished by utilizing inner and outer seals between the roller cutter and the supporting leg therefor. With the present invention, the inner seal at the base end of the journal retains lubricating fluid within the bearing cavity, while the outer seal, axially outward of or surrounding the inner seal, excludes foreign materials.

It is also an object of this invention to replace the usual ball and groove retainment of the roller cutter on the journal, by a single expansible element in the form of a ring easily seated for permanent axial placement of the roller cutter on the journal.

It is still another object of this invention to provide lubrication and sealing therefor of the character thus far referred to for expanding underreamer cutters and hole opening cutters and in the roller cutters of all such tools, where due to design limitations it is impossible to accommodate the aformentioned lubricant resevoir. A feature of the present invention is the provision of said lubrication within the confines of the leg and bearing structure, with increased strength.

SUMMARY OF INVENTION

The roller cutter lubrication and seal provided by the present invention is adapted to be employed in carrying out the rotary method of drilling and it is shown embodied in a roller bit to be carried by a drilling string and operated thereby. The drilling string is tubular and in accordance with conventional practice is supplied at the upper end of the well with drilling mud under pressure. The bit is coupled to the lower end of the drilling string and it is operated to establish a well bore by rotating it and by applying downward pressures while discharging the drilling mud through suitable nozzles therein. Since the invention resides in the journal lubrication and sealing thereof, the following descirption will be correspondingly confined to the roller cutter and leg combination, it being understood that any tool of the type under consideration will involve at least one or more roller cutter and leg combinations.

DRAWINGS

The various objects and features of this invention will be fully understood from the followqng detailed description of the typical preferred forms and applications thereof, throughout which description reference is made to the accompanying drawings, in which.

Figure 1:
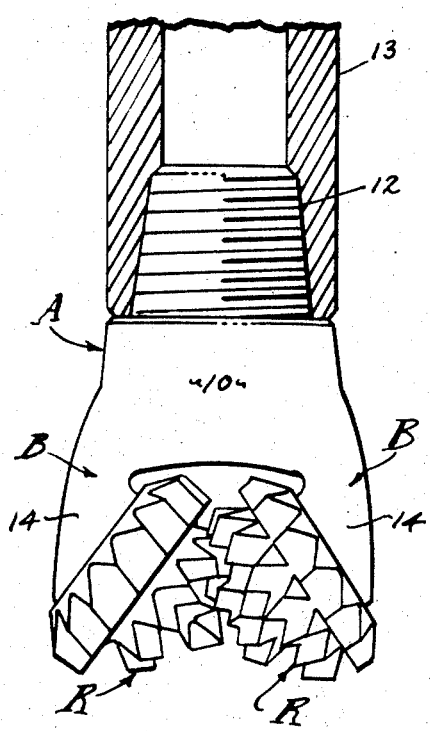
FIG. 1 is a vertical view showing the installation of the drilling bit at the lower end of a drilling string.
Figure 3:
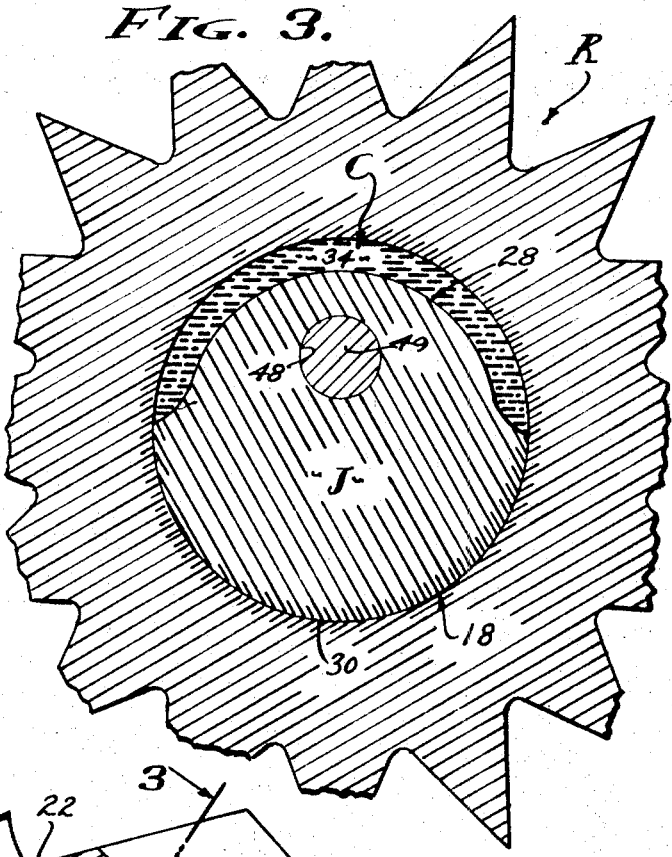
Figure 2:
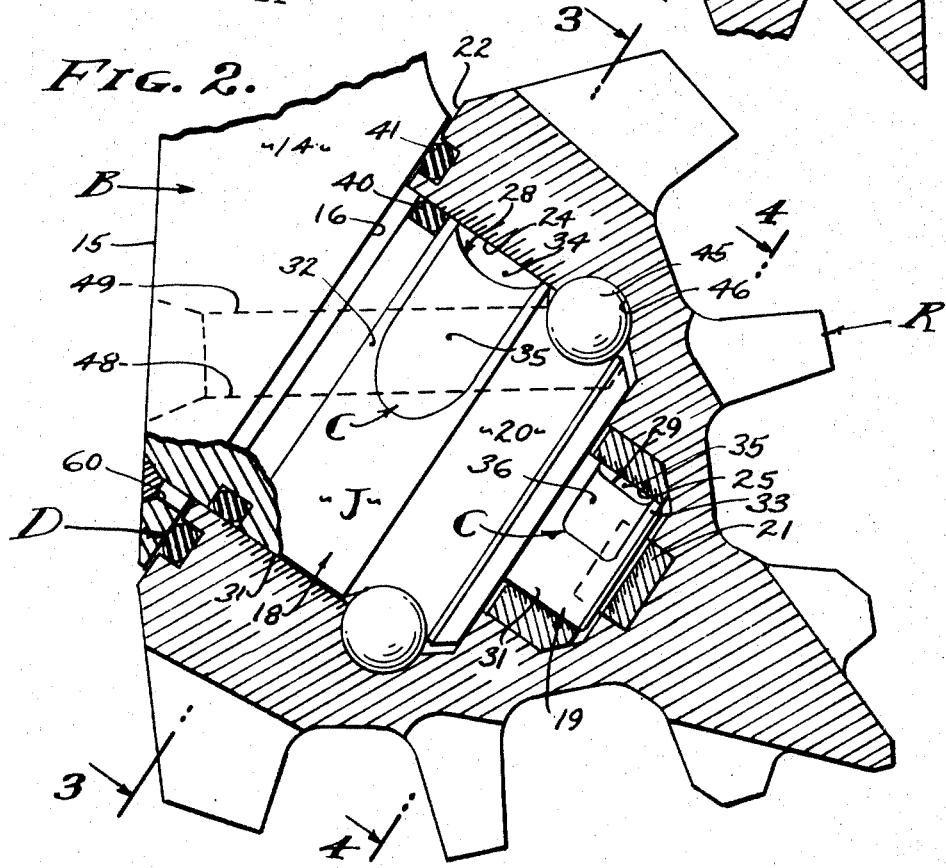
FIG. 2 is an enlarged detailed sectional view taken through one of the cutter and leg combinations shown in FIG. 1.

FIGS. 3 and 4 are transverse sectional views taken as indicated by lines 3—3 and 4—4 on FIG. 2.

FIG. 5 is a view similar to FIG. 2 showing a second form of the invention, and

FIG. 6 is a transverse sectional view taken as indicated by line 6—6 on FIG. 5.

PREFERRED EMBODIMENT

The bit includes generally, a body A and one or more roller cutter and leg combinations B carried by the body. The invention resides in the aforementioned roller cutter and leg combination wherein I provide a lubrication containment means C, a sealing means D therefor, and a unique retaining means E; and all of which are cooperatively related so as to retain maximum strength. The body of the bit includes, generally, a main or middle portion 10 having a central opening or cavity for the conduction of drilling mud to the nozzles therein (not shown). A coupling pin 12 projects upwardly from the body and is shown as a conventional coupling element in the nature of a tubular extension engageable with the lower end of a suitable drill collar 13 provided thereon to carry, guide and rotate the bit. One or more legs 14 are provided on and depend from the main portion 10 of the body and each with an outer wall 15 more or less concentric with the rotational axis of the bit body A, and with an inner face 16 suitably pitched and from which the roller cutter R is mounted upon a downwardly and inwardly projecting journal J. The face 16 of the leg is pitched so that it extends downwardly and outwardly, and as a result of this pitching or inclination of the face 16, the axis of the journal J disposed normal thereto and extends downwardly and inwardly as clearly shown in the drawings.

The journal J is a trunion-like projection preferably integral with the leg 14 and in which the lubricating means C and portions of the retaining means E are formed. As shown, the journal J has a large base bearing 18 of right cylinder form projecting from the face 16 concentric with the axis of rotation, and it has a smaller inner bearing 19 also of right cylinder form projecting inwardly from the said base bearing. The two journal bearings 18 and 19 are axially spaced and are separated by the formation of a retaining groove 20 therebetween, said journal bearings being provided to carry the radial loads imposed by the weight of the drilling string applied to the roller cutter R. The axial load is taken by a shoulder extending between bearings 18 and 19 in a plane normal to the axis of rotation and by a thrust earing insert 21 having a face normal to the axis and exposed at the terminal inner end of the journal J.

The roller cutter R is carried on the journal J and is a frustrum of a cone with its base plane 22 spaced closely adjacent to the face 16 and with a bearing cavity rotatably mounted over the journal J. As shown, the bearing cavity is complementary to the journal J, having a large base bearing 24 coextensive with and rotatably engageable with suitable clearance upon the journal bearing 18, and it has a smaller inner bearing 25 coextensive with and rotatably engageable with suitable clearance upon the journal bearing 19. The roller cutter bearings 24 and 25 are in both instances complete and uninterrupted circular bearings of hard surfaced steel, or the like, for example having carburized and hardened (oil quenched) surfaces of 59-62 Rockwell. In practice, the inner bearing 25 can be made separately and installed as an insert, in order to facilitate heat treatment and the other processes of manufacture. Although the type of roller cutter R can vary as circumstances require, the roller cutter shown has teeth that are circumferentially spaced and in rows extending therearound. There is a row of teeth emanating from the periphery of the roller cutter R at the base plane 22, there is a row of teeth at or near the apex thereof, and there can be one or more intermediate rows of teeth, all as clearly indicated.

In accordance with the present invention I provide the lubrication containment means C incorporated in the journal bearings 18 and 19, and characterized by lubricant containing recesses 28 and 29, formed in the upper portions thereof. The journal bearing and roller cutter bearing interengagement is resolved, generally, into upper and lower interface contact, the former taking downward radial thrust of the roller cutter R and the latter taking upward radial thrust of the roller cutter R. It will become apparent that the said downward thrust of the roller cutter R is minimal while the said upward thrust of the roller cutter R is maximal, and therefore the adequacy of the upper and lower bearing portions is disproportionate, the former being lightly loaded and the latter being heavily loaded. Accordingly, the lower journal bearing surfaces 30 and 31, including more or less 180° thereof, are uninterrupted semicircular bearing surfaces of hard surfaced steel or the like, for example having carburized and hardened (oil quenched) surfaces of 59–62 Rockwell. The upward journal bearing surfaces 32 and 33, including more or less 180°, are interrupted and reduced in area by the recess 28 and 29 respectively, and the remaining semicircular bearing surfaces may or may not be hard surfaced as above described.

The lubricating means C comprised of the recesses 28 and 29 forms volumous chambers 34 and 35 that extend circumferentially of the upper bearing portions, including more or less 180° thereof, leaving sufficient circumferential area to accommodate the minimal downward axial thrust of roller cutter R. The recesses 28 and 29 can be formed in various ways and in practice it is preferred that each be a single circumferentially disposed groove of substantial radial depth cut inwardly from the upper bearing surfaces 32 and 33, the recesses being centered with the bearing surfaces and having opposite marginal portions remaining circumferentially uninterrupted. The bottoms 35 and 36 of the recess grooves are arcuately concaved, more or less, including an arc of more or less 105°, the remaining intact marginal portions of the journal bearing including an area of more or less 20% of the upper portions 32 and 33. Thus, the chambers 34 and 35 reduce the radius of the journal bearing portions 32 and 33 no more than the normal radial penetration of the other required features such as the usual O-ring grooves, and substantially less penetration than the usual depth of ball retainer grooves (as shown in FIG. 2).

In accordance with the present invention I provide the sealing means D for retaining lubrication contained in the recesses 28 and 29 of the lubricating means C and which is characterized by the inner and outer seals 40 and 41 operable at and/or within the base portion of the roller cutter R. The two seals 40 and 41 are spaced apart axially or radially, preferably both radially and axially, so as to establish an annular chamber separating the lubricated cavity within the roller cutter R from the drilling mud under pressure surrounding the bit. The seals are preferably of the O-ring type, the inner seal 40 being carried in a groove in the journal J between the face 16 of the leg and the bore of roller cutter bearing 24, and the outer seal 40 being carried in a groove in the roller cutter R and in the base plane 22 thereof between the roller cutter bearing 24 and outer diameter of the said roller cutter at the base thereof. Note that both O-ring grooves are external. The inner seal 40 is to be engageable within the roller cutter bearing 24 to retain lubricant within the roller cutter cavity, while the outer seal 41 is to be engageable with the leg face 16 to exclude debris, there being the annular chamber 42 extending axially and radially therebetween.

Referring now to the assembly and retaining of the roller cutter R onto the journal J, and referring to FIG. 2 of the drawings, a series of balls 45 is inserted into the retaining groove 20 and a complementary retaining groove 46 formed in the roller cutter R between the roller cutter bearings 24 and 25. The balls 45 are entered into working position through a passage 48 extending from the exterior 15 of leg 14 and opening into the groove 20 within the journal J. A plug 49 is then welded in place to occupy the passage 48 and thereby secure the balls 45 within the confines of the two grooves where they are free to roll in said grooves so as to couple the roller cutter R rotatably upon the journal J.

In accordance with the present invention I provide the retaining means E of FIGS. 5 and 6 to replace as an improvement the above described balls 45, and characterized by a single expansible part that facilitates a permanent assembly while eliminating the complexity of said ball insertion. As clearly shown, the retaining means E involves complementary inner and outer retaining channels 50 and 51 formed in the journal J and roller cutter R respectively, in place of the grooves 20 and 46. The channels are continuous and annular and preferably comprised of opposed parallel side walls 52 and 53 joined by outer and inner diameter walls 54 and 55 respectively. An expansible ring 56 occupies the mated and axially positionable channels, having opposite parallel side faces 57 and 58 slidably engageable within the restrictive confines of the side walls 52 and 53. In accordance with the invention, the expansible ring 56 is depressibly accommodated in the channel 50 during assembly while it is slideably moveable through the roller cutter bearing 24, the inner diameter wall 54 permitting the consequent constriction of the ring 56, and the ring being of split configuration and a length to permit said constriction. However, when the roller cutter R reaches operating position the ring 56 is resiliently expansible into restrictive engagement with the outer diameter wall 55, so as to have divided bearing engagement of the side faces 57 and 58 with the opposed side walls 52 and 53 of the channel. Thus, the assembly of the roller cutter R upon the journal J becomes automatic and permanent.

From the foregoing it will be seen that I have provided a practical and easily manufactured product involving an improved roller bit for well drilling and in which the roller cutter is rotatable upon journals, and reliably coupled thereto. During assembly of the roller cutter R onto the journal J the seals 40 and 41 are installed in their respective grooves and the roller cutter cavity is charged with a quantity of fluid lubricant sufficient to completely occupy the recesses 28 and 29 of lubricating means C and the annular openings and/or all other interstices that will occur between the roller cutter and journal. In practice, the lubricant that has been employed with success is Molybdenum Disulfied in liquid form of high viscosity and which is charged into the cavity in excess and permitted to be displaced and discharged through a vent as the journal J enters the roller cutter cavity and thereafter closed by a plug 60, and whereby said cavity and annulus 42 between the seals 40 and 41 are completely filled. The plug 60 is located at the perimeter of face 16 immediately inside the outer seal 41 and open into the annular between seals 40 and 41. As is indicated the plug 60 is welded in place, and consequently, the journal bearings are completely immersed in the substantially incompressible lubricant liquid captured within the cavity closed at the singular opening thereto surrounding the supporting journal.

Having described only typical preferred forms and applications of my invention, I do not wish to be limited or restricted to the specific details herein set forth, but wish to reserve to myself any modifications or variations that may appear to those skilled in the art:

I claim:

1. In a well drilling bit having a body with at least one roller cutter and leg combination including, a journal of right cylinder form projecting on an axis from the leg and having an uninterrupted semi-circular load bearing lower side and having lubrication containment means formed therein as a recess in and extending circumferentially substantially throughout the upper non-bearing side thereof, and a roller cutter having a cavity opening in opposition to the leg and with an uninterrupted circular bearing complementary to and rotatably engaged upon the said journal, retaining means rotatably coupling the roller cutter upon the journal, and a sealing means slideably engaged between the roller cutter and journal at the opening in opposition to the leg.

2. The roller cutter and leg combination for a well drilling bit as set forth in claim 1, wherein the journal is comprised of axially spaced right cylinder forms and each having an uninterrupted semicircular load bearing lower side and each having lubrication containment means formed therein as recesses in and extending circumferentially substantially throughout the upper non-bearing side thereof, and wherein the roller cutter has axially spaced uninterrupted circular bearings complementary to and rotatably engaged upon said axially spaced right cylinder forms respectively.

3. The roller cutter and leg combination for a well drilling bit as set forth in claim 1, wherein the circumferential recess in the upper side of the journal has at least one marginal portion of the journal remaining circumferentially intact.

4. The roller cutter and leg combination for a well drilling bit as set forth in claim 1, wherin the circumferential recess in the upper side of the journal has a full semicircular configuration with at least one marginal portion of the journal remaining circumferentially intact.

5. The roller cutter and leg combination for a well drilling bit as set forth in claim 1, wherein the circumferential recess in the upper side of the journal is of full semicircular configuration and of concaved arcuate cross section extending between circumferentially intact marginal portions of the journal.

6. The roller cutter and leg combination for a well drilling bit as set forth in claim 1, wherein the circumferential recess in the upper side of the journal occupies a major portion of the upper semicircular portion of the journal.

7. The roller cutter and leg combination for a well drilling bit as set forth in claim 1, wherein the circumferential recess in the upper side of the journal 70% to 90% of the upper semicircular portion of the journal.

8. The roller cutter and leg combination for a well drilling bit as set forth in claim 1, wherein the uninterrupted semicircular load bearing lower side of the journal is of hard faced material, and wherein the circumferential recess in the upper side of the journal is disposed between opposite uninterrupted marginal portions of the journal.

9 The roller cutter and leg combination for a well drilling bit as set forth in claim 1, wherein the uninterrupted semicircular load bearing lower side of the journal and the uninterrupted circular bearing of the roller cutter are of hard faced material.

10. The roller cutter and leg combination for a well drilling bit as set forth in claim 1, wherein liquid lubrication comprised of Molybdenum Disulfied is charged into and contained within the circumferential recess to flood the bearing interfaces of the load bearing lower side of the journal with the circular bearing of the roller cutter.

11. The roller cutter and leg combination for a well drilling bit as set forth in claim 1, wherein the uninterrupted semicircular load bearing lower side of the journal and the uninterrupted circular bearing of the roller cutter are of hard faced steel, and wherein liquid lubrication comprised of Molybdenum Disulfied is charged into and contained within the circumferential recess to flood the bearing interfaces of the load bearing lower side of the journal with the circular bearing of the roller cutter.

12. In a well drilling bit having a body with at least one roller cutter and leg combination including, a bearing trunion of right cylinder form projecting on an axis from the leg and having lubrication containment means formed herein as a recess establishing a chamber, a roller cutter having a cavity opening in opposition to the leg and received over the bearing trunion, bearing means rotatably journaling and retaining means rotatably coupling the roller cutter upon said bearing trunion, and a sealing means comprised of spaced inner and outer annular seals at said opening and between the roller cutter and the combined opposite leg and bearing trunion, the inner seal being exposed to the roller cutter cavity and lubricant from the said recess chamber in the bearing trunion, and the outer seal being exposed to the fluid surrounding the roller cutter and leg combination.

13. The roller cutter and leg combination for a well drilling bit as set forth in claim 12, wherein the inner and outer seals are axially spaced.

14. The roller cutter and leg combination for a well drilling bit as set forth in claim 12, wherein the inner and outer seals are radially spaced.

15. The roller cutter and leg combination for a well drilling bit as set forth in claim 12, wherein the seals are axially and radially spaced.

16. The roller cutter and leg combination for a well drilling bit as set forth in claim 12, wherein the leg has a face normal to said axis and from which the bearing trunion projects, and wherein at least one of the spaced seals is engageable with said face.

17. The roller cutter and leg combination for a well drilling bit as set forth in claim 12, wherein the roller cutter cavity has a concentric bore, and wherein at least one of the spaced seals is engageable with said bore.

18. The roller cutter and leg combination for a well drilling bit as set forth in claim 12, wherein the leg has a face normal to said axis and from which the bearing trunion projects and one of the spaced seals is engageable therewith, and wherein the roller cavity has a concentric bore and the other of said spaced seals is engageable therewith.

19. The roller cutter and leg combination for a well drilling bit as set forth in claim 12, wherein the leg has a face normal to said axis and from which the bearing trunion projects, and wherein the roller cutter has a base plane in which there is an annular groove receiving and holding one of the spaced seals engaged with said face.

20. The roller cutter and leg combination for a well drilling bit as set forth in claim 12, wherein the roller cutter cavity has a concentric bore and wherein the bearing trunion has an annular groove receiving and holding one of the spaced seals engaged with said bore.

21. The roller cutter and leg combination for a well drilling bit as set forth in claim 12, wherein the leg has a face normal to said axis and from which the bearing trunion projects and the roller cutter has a base plane in which there is an annular groove receiving and holding one of the spaced seals engaged with said face, and wherein the roller cutter cavity has a concentric bore and the bearing trunion has an annular groove receiving and holding the other of the spaced seals engaged with said bore.

22. In a well drilling bit having a body with at least one roller cutter and leg combination including, a bearing trunion of right cylinder form projecting on an axis from the leg, a roller cutter having a cavity opening in opposition to the leg and received over the bearing trunion, there being complementary inner and outer annular channels formed in the bearing trunion and roller cutter cavity respectively, and a resiliently expansible ring constrictable into one of said channels during assembly and thereafter expansible partially into the other of said channels upon alignment therewith.

23. The roller cutter and leg combination for a well drilling bit as set forth in claim 22, wherein the resiliently expansible ring is a split ring and is thereby circumferentially collapsible.

24. The roller cutter and leg combination for a well drilling bit as set forth in claim 22, wherein the resiliently collapsible ring is constrictable into the inner channel in the bearing trunion and thereafter expansible partially into the other of said channels in the roller cutter cavity.

25. The roller cutter and leg combination for a well drilling bit as set forth in claim 22, wherein the complementary inner and outer channels have alignably opposed sides, and wherein the resiliently expansible ring has opposed faces slidably engageable with the said channel sides.

26. The roller cutter and leg combination for a well drilling bit as set forth in claim 22, wherein the resiliently collapsible ring is constrictable into the inner channel in the bearing trunion and thereafter expansible into respective engagement with a bottom of the other of said channels in the roller cutter cavity.

* * * * *